(12) United States Patent
Eo et al.

(10) Patent No.: US 10,739,496 B2
(45) Date of Patent: Aug. 11, 2020

(54) OPTICAL ELEMENT AND DISPLAY DEVICE HAVING THE SAME

(71) Applicant: LG Display Co., Ltd., Seoul (KR)

(72) Inventors: Yoon-Jung Eo, Paju-si (KR); Hyun-Woo Jeon, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 8 days.

(21) Appl. No.: 15/825,620

(22) Filed: Nov. 29, 2017

(65) Prior Publication Data
US 2018/0149772 A1 May 31, 2018

(30) Foreign Application Priority Data

Nov. 30, 2016 (KR) .................. 10-2016-0162025

(51) Int. Cl.
| | | |
|---|---|---|
| G02B 1/04 | (2006.01) | |
| G02B 5/02 | (2006.01) | |
| G02B 1/14 | (2015.01) | |
| G02F 1/1335 | (2006.01) | |
| G02F 1/13357 | (2006.01) | |
| F21V 13/02 | (2006.01) | |
| G09G 3/22 | (2006.01) | |

(52) U.S. Cl.
CPC ............... *G02B 1/04* (2013.01); *F21V 13/02* (2013.01); *G02B 1/14* (2015.01); *G02B 5/0236* (2013.01); *G02B 5/0294* (2013.01); *G02F 1/133504* (2013.01); *G02F 1/133606* (2013.01); *G09G 3/22* (2013.01); *G02F 2001/133507* (2013.01)

(58) Field of Classification Search
CPC .................... G02B 1/04; G02B 1/14
USPC ............................................ 362/19
See application file for complete search history.

(56) References Cited

U.S. PATENT DOCUMENTS

| | | | | |
|---|---|---|---|---|
| 5,995,183 A | * | 11/1999 | Tsuyoshi ............ | G02B 5/0242 349/112 |
| 8,563,130 B2 | * | 10/2013 | Chung ................. | C09D 5/006 428/338 |
| 9,019,449 B2 | * | 4/2015 | Baek ................... | H04N 13/307 349/114 |
| 9,696,583 B2 | * | 7/2017 | Lee ...................... | G02F 1/1336 |
| 2010/0075136 A1 | * | 3/2010 | Song .................... | B32B 27/34 428/328 |
| 2010/0149460 A1 | * | 6/2010 | Akao ................... | G02B 5/3016 349/75 |
| 2012/0064134 A1 | * | 3/2012 | Bourke, Jr. ........... | A61Q 17/04 424/401 |
| 2016/0077382 A1 | * | 3/2016 | Yasunaga ............. | H05B 33/14 362/19 |

* cited by examiner

*Primary Examiner* — Michael G Lee
*Assistant Examiner* — David Tardif
(74) *Attorney, Agent, or Firm* — Morgan, Lewis & Bockius LLP

(57) ABSTRACT

Disclosed are an optical element which offers certain direction of light diffusion by disposing, in a resin having a refractive index n1, an anisotropic polymer having a refractive index n2 different from n1 in a predetermined direction, and a display device including the same. Such control of viewing angles is possible without using any louver pattern and eliminates the necessity of an additional brightness enhancement film, thus advantageously decreasing manufacturing costs and preventing defects such as diagonal line spots.

13 Claims, 11 Drawing Sheets

| wt% | Thickness | Light leakage | Haze | Front brightness | Upper viewing angle (15% of front brightness) |
|---|---|---|---|---|---|
| 5 | 20 | 1LV. | 6.0 | 138% | 48 |
| 20 | 85 | 1LV. | 24.2 | 133% | 43 |
| 35 | 150 | 2LV. | 42.3 | 130% | 39 |
| 50 | 215 | 2LV. | 60.4 | 126% | 35 |
| 70 | 300 | 4LV. | 84.6 | 122% | 32 |

| wt% | Thickness | Light leakage | Haze | recycling efficiency | Front brightness | Upper viewing angle (15% of front brightness) |
|---|---|---|---|---|---|---|
| 5 | 20 | 1LV. | 6.0 | 105% | 104% | 36 |
| 20 | 85 | 1LV. | 24.2 | 110% | 107% | 40 |
| 35 | 150 | 2LV. | 42.3 | 118% | 110% | 43 |
| 50 | 215 | 2LV. | 60.4 | 124% | 116% | 46 |
| 70 | 300 | 4LV. | 84.6 | 131% | 123% | 50 |

OPTICAL ELEMENT AND DISPLAY DEVICE HAVING THE SAME

This application claims the benefit of Korean Patent Application No. 2016-0162025, filed on Nov. 30, 2016, which is hereby incorporated by reference as if fully set forth herein.

BACKGROUND

Technical Field

The present invention relates to a display device. More specifically, the present invention relates to an optical element to control a viewing angle and a display device including the same.

Discussion of the Related Art

In general, a liquid crystal display device may include pixels disposed in the form of a matrix. Each of the pixel may be supplied a data signal depending on an image information. The light transmission of the pixels may be controlled by the data signal for displaying a desired image.

FIG. 1 is a perspective view schematically illustrating the structure of a related art liquid crystal display device.

Referring to FIG. 1, the related art liquid crystal display includes a liquid crystal panel 10 including pixels arranged in the form of a matrix to display an image, driving parts 15 and 16 to drive the pixels, a backlight unit disposed on the rear surface of the liquid crystal panel 10 to emit light toward the entire surface of the liquid crystal panel 10, and a panel guide 45 to accommodate the liquid crystal panel 10 and the backlight unit and fix the same.

The liquid crystal panel 10 includes a color filter substrate, an array substrate and a liquid crystal layer between the color filter substrate and the array substrate. The color filter substrate and the array substrate are bonded together such that the uniform cell gap is maintained.

The liquid crystal panel 10 in which the color filter substrate and the array substrate are bonded together may include a common electrode and a pixel electrode to apply an electric field to the liquid crystal layer. In addition, when controlling a voltage of a data signal applied to the pixel electrode while applying the voltage to the common electrode, the liquid crystal of the liquid crystal layer is rotated by dielectric anisotropy according to the electric field between the common electrode and the pixel electrode, thereby transmitting or blocking light on a pixel basis to display a letter or image.

In this case, each of the pixel may include a switching element such as a thin film transistor (TFT) to control the voltage of the data signal applied to the pixel electrode on a pixel basis.

Upper and lower polarizing plates may be attached to the outer side of the liquid crystal panel 10. The lower polarizing plate polarizes light passed through the backlight unit and the upper polarizing plate polarizes light passed through the liquid crystal panel 10.

The backlight unit used as a light source of the liquid crystal panel 10 is divided into an edge type and a direct type depending on the way of locating light emitting lamps.

The edge type supplies light through lamps disposed as a light source at one side of the liquid crystal panel 10. More specifically, the backlight unit of the edge type includes a plurality of lamps disposed at one side of the light guide plate 42 and a reflective plate 41 disposed at the rear surface of the light guide plate 42.

The light emitted from the lamps enters the side surface of the light guide plate 42. The reflective plate 41 disposed at the rear surface of the light guide plate 42 reflects light transmitted to the rear surface of the light guide plate 42 toward the optical sheets 43 on the upper surface of the light guide plate 42, thereby reducing light loss and improving uniformity.

The liquid crystal panel 10 including the color filter substrate and the array substrate is loaded through the panel guide 45 on the backlight unit. The liquid crystal panel 10, the panel guide 45 and the backlight unit are disposed between a cover bottom 50 and a case top 60. The cover bottom 50 and the case top 60 are coupled by screws to constitute the liquid crystal display.

A viewing angle control sheet 44 to control a viewing angle is disposed on the optical sheet 43, which will be described in detail with reference to the drawings.

FIG. 2 is a perspective view illustrating the configuration of a viewing angle control sheet of the related art liquid crystal display device shown in FIG. 1.

In addition, FIGS. 3A and 3B are views exemplarily showing light-emitting properties of a viewing angle control sheet using a louver.

Referring to FIG. 2, the related art viewing angle control sheet 44 may have a structure in which a louver pattern 44b made of carbon black is disposed between two pieces of a base film 44a made of polycarbonate (PC). The related art viewing angle control sheet 44 may block light incident in an inclination direction and thereby reduce upper and lower viewing angles.

That is, referring to FIGS. 3A and 3B, the related art viewing angle control sheet 44 having transmits light emitted parallel to the louver pattern 44b, but blocks light emitted at an inclination thereto (that is, light emitted at upper and lower viewing angles), thereby controlling a viewing angle in a vertical direction.

For example, this property prevents a phenomenon in which the liquid crystal panel 10 is reflected on a vehicle front glass, thereby contributing to safe driving.

The related art viewing angle control sheet 44 requires formation of a trapezoidal louver pattern 44b for controlling a viewing angle. In addition, two layers, i.e., upper and lower layers of base films 44a are formed in order to support the louver pattern 44b, thus causing an increase in costs and a drawback in which diagonal spots are visible along the texture of the louver pattern 44b. That is, when the line squashing occurs by non-uniform roller pressure during a process of laminating the base film 44a on upper and lower surfaces of the louver pattern 44b, a part of louver may be damaged, so that black or white line defects may occur.

In addition, since the louver pattern 44b including carbon black serves as a light-shielding film, front brightness may be decreased. Accordingly, application of a film to improve brightness such as a dual brightness enhancement film (DBEF) is a must. For this reason, there is a drawback of increased cost.

SUMMARY

Accordingly, embodiments of the present disclosure are directed to an optical element and a display device including the same that substantially obviate one or more of the problems due to limitations and disadvantages of the related art.

An aspect of the present disclosure is to provide an optical element to control a viewing angle without using any louver and a display device including the same.

Another aspect of the present disclosure is to provide an optical element to improve a front brightness without adding any film for improving brightness and a display device including the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, an optical element comprises a resin having a refractive index n1, and an anisotropic polymer arranged in a predetermined direction in the resin and having a refractive index n2 larger than n1.

The resin may include triacetate cellulose (TAC), acryl, polyethylene terephthalate (PET), polycarbonate (PC), or a cycloolefin polymer (COP).

The anisotropic polymer may take a rod or cylindrical shape having an orientation in one direction.

n1 may be different from a refractive index in a short axis n3 of the anisotropic polymer, and n1 may be different from a refractive index in a long axis n4 of the anisotropic polymer.

n2 may be at least 1.3, preferably 1.4 to 1.8, more preferably 1.5 to 1.68.

The anisotropic polymer may be added in an amount of, 5 to 50 wt %, preferably, 35 to 50 wt % with respect to the optical element.

n1 may be equal to the refractive index in the short axis n3 of the anisotropic polymer, and the refractive index in the long axis n4 of the anisotropic polymer may be larger than n3.

n1 and n3 may be 1.3 to 1.6, preferably 1.5±0.05.

n4 may be at least 1.3, preferably 1.35 to 1.65.

The anisotropic polymer may be added in an amount of 5 to 50 wt %, preferably 5 to 20 wt % with respect to the optical element.

The anisotropic polymer may further include carbon black or a black dye.

In another aspect, a display device comprises a display panel including the optical element and a polarization plate provided at a side of the optical element.

The optical element may include an anisotropic polymer disposed in a direction orthogonal to a light transmission axis of the polarizing plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Figure 1:
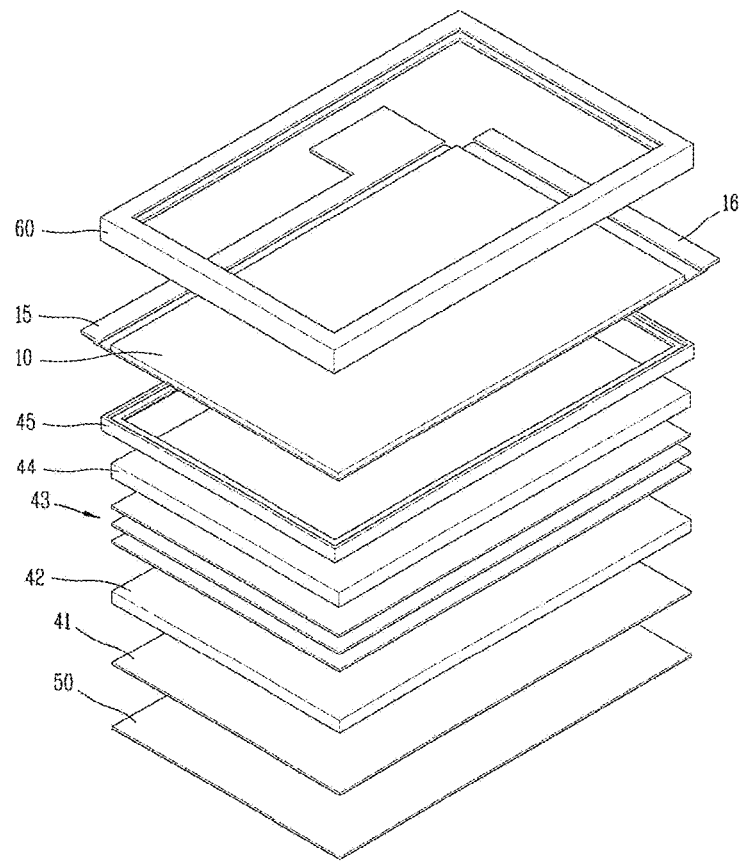
FIG. 1 is a perspective view schematically illustrating the structure of a related art liquid crystal display device.
Figure 2:
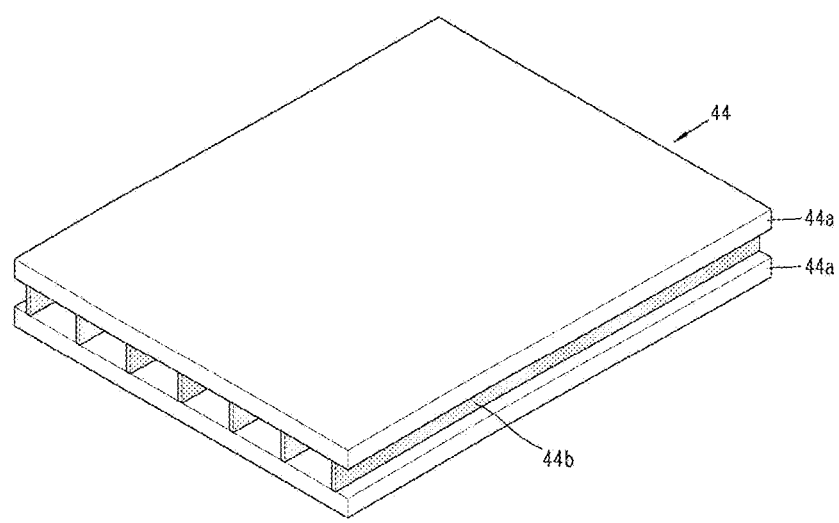
FIG. 2 is a perspective view illustrating the configuration of a viewing angle control sheet of the related art liquid crystal display device shown in FIG. 1.
Figure 3A:
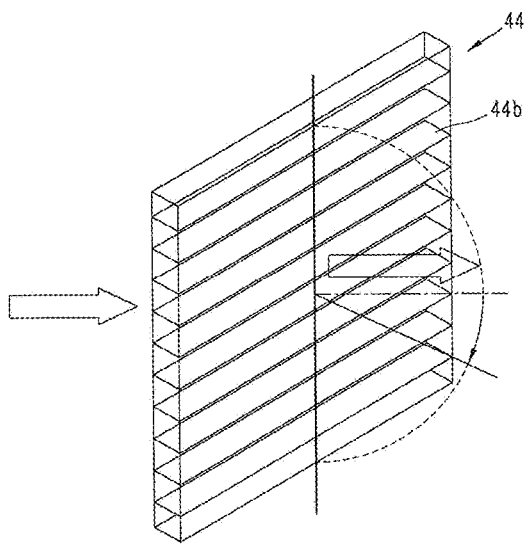
FIGS. 3A and 3B are views exemplarily showing light-emitting properties of a viewing angle control sheet using a louver.
Figure 3B:
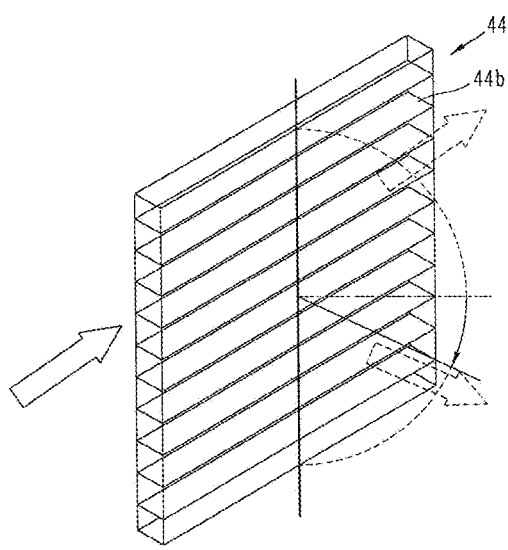

Hereinafter, embodiments of the optical element and the display device including the same will be described with reference to the annexed drawings in detail such that a person who has ordinary knowledge in the field to which the present invention pertains can easily implement the embodiments.

The advantages, features and methods of achieving the same of the present invention will be more clearly understood from the following detailed description taken in conjunction with the accompanying drawings. However, the present invention is not limited to a variety of embodiments described below and can be implemented in various forms. The embodiments of the present invention are provided only to completely disclose the present invention and fully inform a person having ordinary knowledge in the field to which the present invention pertains of the scope of the present invention. Accordingly, the present invention is defined by the scope of the claims. Wherever possible, the same reference numbers will be used throughout the drawings to refer to the same or like parts. The sizes and relative sizes of layers and regions shown in the drawings may be exaggerated for clear description.

It will be understood that when an element such as an element or layer is referred to as being "on" another element or layer, it can be directly on the other element or an intervening element or layer may also be present. On the other hand, when an element is referred to as being "directly on" or "right on" another element, no intervening element or layer may be present.

Spatially relative terms such as below, beneath, lower, above and upper may be used to clearly describe the relation between one device or element and another device or element. It should be understood that spatially relative terms include different directions of devices or elements when they are used in addition to the direction shown in the drawing or upon movement. For example, when the element shown in the drawing is turned over, one element referred to as being "below" or "beneath" another element may be placed "above" the other element. Accordingly, "below" as the illustrative term may include both "below" and "above", with reference to the drawings.

The terms used in the present specification are provided to illustrate embodiments of the present invention and should not be construed as limiting the present invention. Throughout the specification, a component described in a singular form encompasses components in a plural form unless particularly stated otherwise. Terms such as "comprise" and "comprising" used herein do not exclude presence or addition of another component, step, operation and/or element, apart from the mentioned component, step, operation and/or element.

Figure 4:
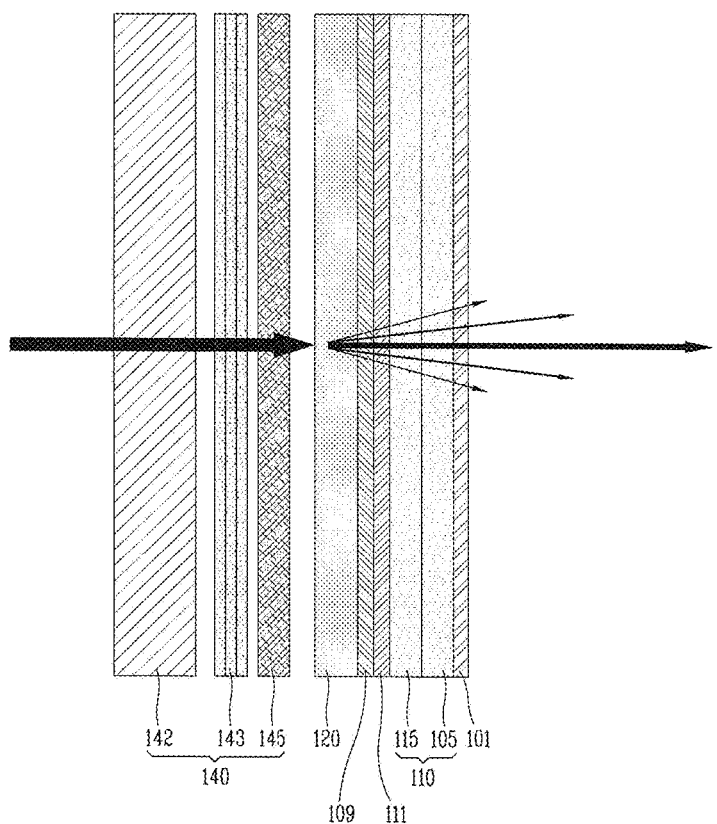
FIG. 4 is a sectional view schematically illustrating the configuration of a display device according to a first embodiment of the present invention and a route of emitted light.

FIG. 4 is a sectional view schematically illustrating the configuration of a display device according to a first embodiment of the present invention and a route of emitted light. In this case, the display device shown in FIG. 4 suggests a liquid crystal display as an example, but the present invention is not limited thereto.

Figure 5:
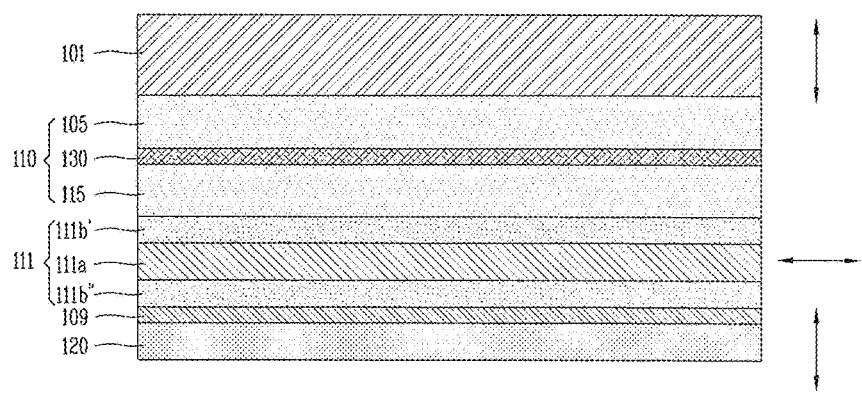
FIG. 5 is a sectional view exemplarily illustrating a partial configuration of the display device according to the first embodiment of the present invention shown in FIG. 4.

FIG. 5 is a sectional view exemplarily illustrating a partial configuration of the display device according to the first embodiment of the present invention. For convenience of description, FIG. 5 further illustrates a light transmission axis of a polarizing plate and a long axis direction of an anisotropic polymer.

Figure 6A:
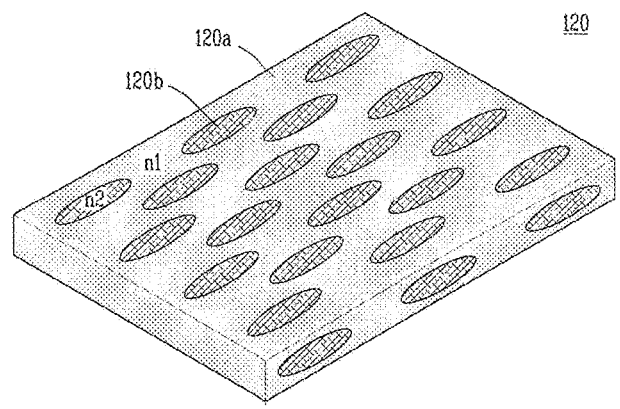
FIGS. 6A and 6B are perspective views exemplarily illustrating the configuration of an optical element in the display device according to the first embodiment of the present invention shown in FIG. 4.
Figure 6B:
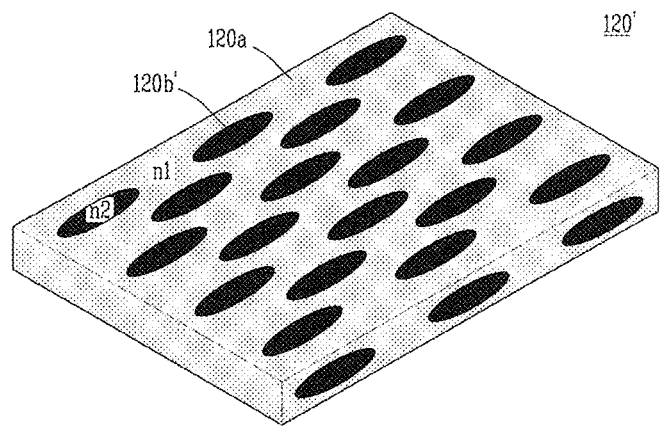

In addition, FIGS. 6A and 6B are perspective views exemplarily illustrating the configuration of an optical element regarding the display device according to the first embodiment of the present invention shown in FIG. 4.

Referring to FIG. 4 to FIGS. 6A and 6B, the display device according to the first embodiment of the present invention includes a display panel 110 where pixels are arranged in the form of a matrix to display an image, and a backlight unit 140 disposed on the rear surface of the display panel 110 to emit light toward the entire surface of the display panel 110.

In the case where a liquid crystal display is suggested as an example of the display device, the display panel 110 may be a liquid crystal panel. Thus, the display panel 110 includes a color filter substrate 105 and an array substrate 115 which are bonded to each other while facing each other to maintain a uniform cell gap and a liquid crystal layer 130 formed in the cell gap between the color filter substrate 105 and the array substrate 115.

The color filter substrate 105 includes a color filter which includes a plurality of sub-color filters to realize red, green and blue colors, a black matrix to distinguish the sub-color filters from one another and block transmission of light through the liquid crystal layer 130, and a transparent common electrode to apply a voltage to the liquid crystal layer 130.

In addition, the array substrate 115 includes a plurality of gate lines and a plurality of data lines which are arranged in horizontal and vertical directions to define a plurality of pixel areas, a thin film transistor disposed as a switching element at each of the intersections between the gate lines and the data lines, and a pixel electrode formed in each pixel area. At this time, in the case of an in-plane switching (IPS) liquid crystal display, instead of the color filter substrate 105, a common electrode may be formed on the array substrate 115.

As such, a common electrode and a pixel electrode are formed on the display panel 110 including the color filter substrate 105 and the array substrate 115 which are bonded to each other, thus applying a voltage to the liquid crystal layer 130. In addition, when controlling a voltage of a data signal applied to the pixel electrode while applying a voltage to the common electrode, the liquid crystal of the liquid crystal layer 130 is rotated by dielectric anisotropy depending on the electric field between the common electrode and the pixel electrode, thus transmitting or blocking light on a pixel basis, to display a letter or image.

At this time, in order to control the voltage applied to the pixel electrode on a pixel basis, a switching element such as a thin film transistor may be independently provided in each pixel.

Upper and lower polarizing plates 101 and 111 may be attached at the outer side of the display panel 110 having this configuration. In this case, the lower polarizing plate 111 polarizes light passing through the backlight unit 140 and the upper polarizing plate 101 polarizes light passing through the display panel 110.

The lower polarizing plate 111 attached to the bottom surface of the display panel 110 may include a polarizer 111*a*, and protective layers 111*b*' and 111*b*" formed at upper and lower sides of the polarizer 111*a*.

The lower polarizing plate 111 is a general polarizing element which transmits only some light having a vibration surface of a predetermined direction, among natural light having a vibration surface of all directions of 360 degrees, and absorbs the other light, thereby obtaining polarized light. For example, FIG. 5 shows, as an example, a case in which the lower polarizing plate 111 has a light transmission axis in a horizontal (left-and-right) direction. In this case, the upper polarizing plate 101 may have a light transmission axis in a vertical (up-and-down) direction.

An element which is divided the light into a polarizing component vertical and a polarizing component parallel to an incident surface is generally used as the polarizer 111*a* having light absorbability. Thus, linear polarization and elliptic polarization can be obtained by the polarizer 111*a*.

For this purpose, uniform polarization and high polarization efficiency can be obtained by selecting an appropriate material and processing into the form of a film depending on application.

For example, a polyvinyl alcohol (PVA) film treated with iodine may be used as the polarizer 111a. In addition, a triacetate cellulose (TAC) film or an acrylic film, for example, a polymethylmethacrylate (PMMA) film, which has stability to dimensions and variation, abrasion resistance and excellent transmittance, UV absorbance and durability may be used as the protective layer 111b' which is an inner element for protecting the PVA film, but the present invention is not limited thereto.

The lower polarizing plate 111 having this configuration can be attached to the lower surface of the array substrate 115 through an adhesive agent.

The present invention is not limited to a direct type or edge type which depends on the way of disposing the light emitting lamp. However, for example, more specifically, in the case of the edge-type backlight unit 140, a plurality of lamps may be installed at one side of the light guide plate 142, and a reflection plate may be installed at the rear surface of the light guide plate 142.

At this case, the lamp may utilize, as a light source, any one of a variety of light sources such as a cold cathode fluorescent lamp (CCFL), an external electrode fluorescent lamp (EEFL), a hot cathode fluorescent lamp (HCFL) and a light emitting diode (LED).

Light emitted from the lamp is incident upon the side surface of the light guide plate 142 made of a transparent material, and the reflection plate disposed on the rear surface of the light guide plate 142 reflects light transmitted to the rear surface of the light guide plate 142 toward optical sheets 143 on the upper surface of the light guide plate 142, thereby reducing light loss and improving uniformity.

At this time, the optical sheet 143 according to the first embodiment of the present invention includes a diffusion sheet and a prism sheet, and may further include a protective sheet. The prism sheet serves to collect light from the light guide plate 242, the diffusion sheet serves to diffuse light from the prism sheet, and the protective sheet serves to protect the prism sheet and the diffusion sheet. The light passing through the protective sheet is supplied toward the display panel 210.

The display device according to the first embodiment of the present invention may further include a brightness enhancement film 145 such as a dual brightness enhancement film (DBEF) on the optical sheet 143, but the present invention is not limited thereto.

As mentioned above, the display panel 110 including the color filter substrate 105 and the array substrate 115 is loaded on the backlight unit 140 having this configuration, to constitute the display device.

In this case, the present invention is characterized in that an optical element 120 to control properties of viewing angle (that is, brightness depending on viewing angle, in other words, emission direction of light) is provided between the display panel 110 and the backlight unit 140. At this time, there is suggested an example in which the optical element 120' shown in FIG. 6B includes an anisotropic polymer 120b' in which carbon black, a black dye or the like is incorporated. In this case, the anisotropic polymer 120b' may serve as a barrier, thus exerting better effect of blocking upper and lower viewing angles than the optical element 120 shown in FIG. 6A.

In particular, the optical element 120 according to the first embodiment of the present invention is laminated onto the lower polarizing plate 111 through an adhesive agent 109. However, the present invention is not limited thereto and the optical element 120 may be provided in the form of a sheet in the backlight unit 140 to constitute the backlight unit 140.

The optical element 120 according to the first embodiment of the present invention includes a resin 120a having a refractive index n1 and an anisotropic polymer 120b having a refractive index n2 different from n1, arranged in a predetermined direction in the resin 120a. In this case, n2 represents a mean refractive index of the anisotropic polymer 120b, which is shown by (n3+n4)/2, assuming that a refractive index in a short axis is n3 and a refractive index in a long axis is n4.

In this case, the resin 120a may be made of a polymer having no anisotropy. As a medium layer, the resin 120a preferably has a refractive index n1 of 1.3 to 1.6, for example, which is the same as the adhesive agent 109 having a refractive index of 1.5±0.05.

The resin 120a may be formed using a base material for an optical film, such as triacetate cellulose (TAC), acryl, polyethylene terephthalate (PET), polycarbonate (PC), or a cycloolefin polymer (COP).

In addition, the anisotropic polymer 120b may have any shape such as a rod or cylindrical shape so long as it can have an orientation (for example, n3<n4) in one direction.

In this case, the optical element 120 according to the first embodiment of the present invention is characterized in that n2 is set to be larger than n1 in order to block upper and lower viewing angles, that is, to reduce diffusion of light in upper and lower directions. Here, as shown in FIG. 4, the upper and lower directions are based on the center where an image is displayed, when the display device is provided vertically.

That is, in order to block upper and lower viewing angles, the mean refractive index n2 of the anisotropic polymer 120b should be larger than the refractive index n1 of the resin 120a, and as the gap therebetween increases, the effect of blocking the viewing angle increases. For example, n2 should be at least 1.3, preferably, 1.4 to 1.8, more preferably, 1.5 to 1.68.

In this case, n1 should be different from n3, while n1 should be different from n4.

When the rod-shaped anisotropic polymer 120b having the refractive index n2 is arranged in a vertical direction in the resin 120a having the refractive index n1 (when the display device is provided vertically as shown in FIG. 4), light emitted from the backlight unit 140 diffuses due to the difference in refractive index between the anisotropic polymer 120b and the resin 120a. In this case, due to the rod shape of the anisotropic polymer 120b, based on the arrangement direction, horizontal diffusion of light is increased and vertical diffusion thereof is decreased.

Regarding the optical element 120 according to the first embodiment of the present invention, the anisotropic polymer 120b may be disposed in a substantially orthogonal direction to the light transmission axis of the lower polarizing plate 111. That is, the long direction of the anisotropic polymer 120b may be set in a direction substantially orthogonal to the light transmission axis of the lower polarizing plate 111.

Accordingly, it is possible to block the viewing angle in the orthogonal direction. For example, when applied to a vehicle, a phenomenon in which a display panel screen is reflected on a vehicle front glass can be prevented due to this property.

In addition, the current viewing angle control sheet using the related art louver leads to an about 17% decrease in front brightness, while the optical element 120 according to the present invention can increase front brightness.

Meanwhile, brightness recycling is possible by controlling anisotropy of the anisotropic polymer, which will be described in detail with reference to a second embodiment of the present invention.

Figure 7:
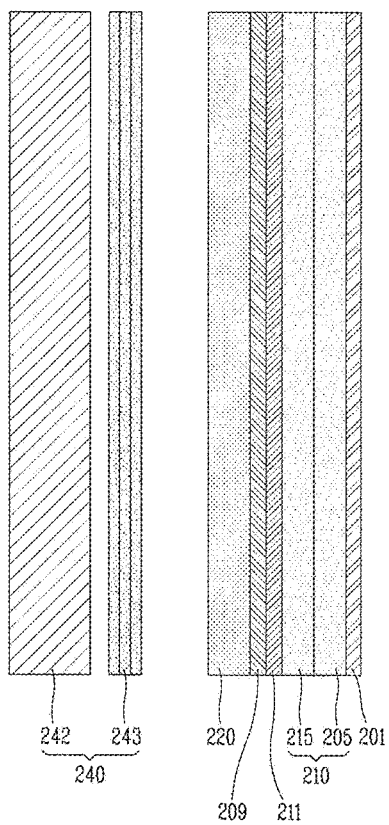
FIG. 7 is a sectional view schematically illustrating the configuration of a display device according to a second embodiment of the present invention.

FIG. 7 is a sectional view schematically illustrating the configuration of a display device according to the second embodiment of the present invention. In this case, an example in which the display device shown in FIG. 7 is a liquid crystal display is suggested, but the present invention is not limited thereto.

Figure 8:
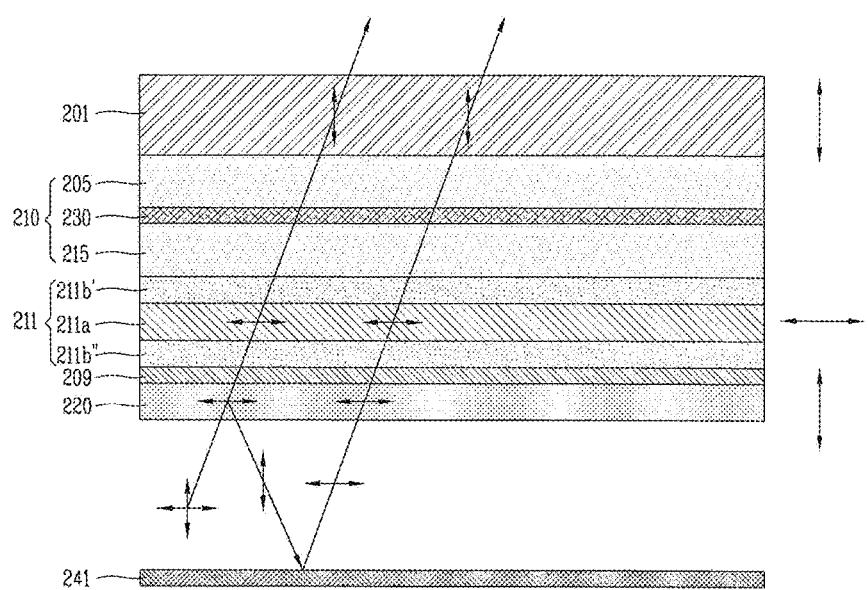
FIG. 8 is a sectional view exemplarily illustrating a partial configuration of the display device according to the second embodiment of the present invention shown in FIG. 7 and a route of emitted light.

FIG. 8 is a sectional view exemplarily illustrating a partial configuration of the display device according to the second embodiment of the present invention shown in FIG. 7. For convenience of description, FIG. 8 further illustrates a light transmission axis of a polarizing plate and a long axis direction of an anisotropic polymer.

Figure 9:
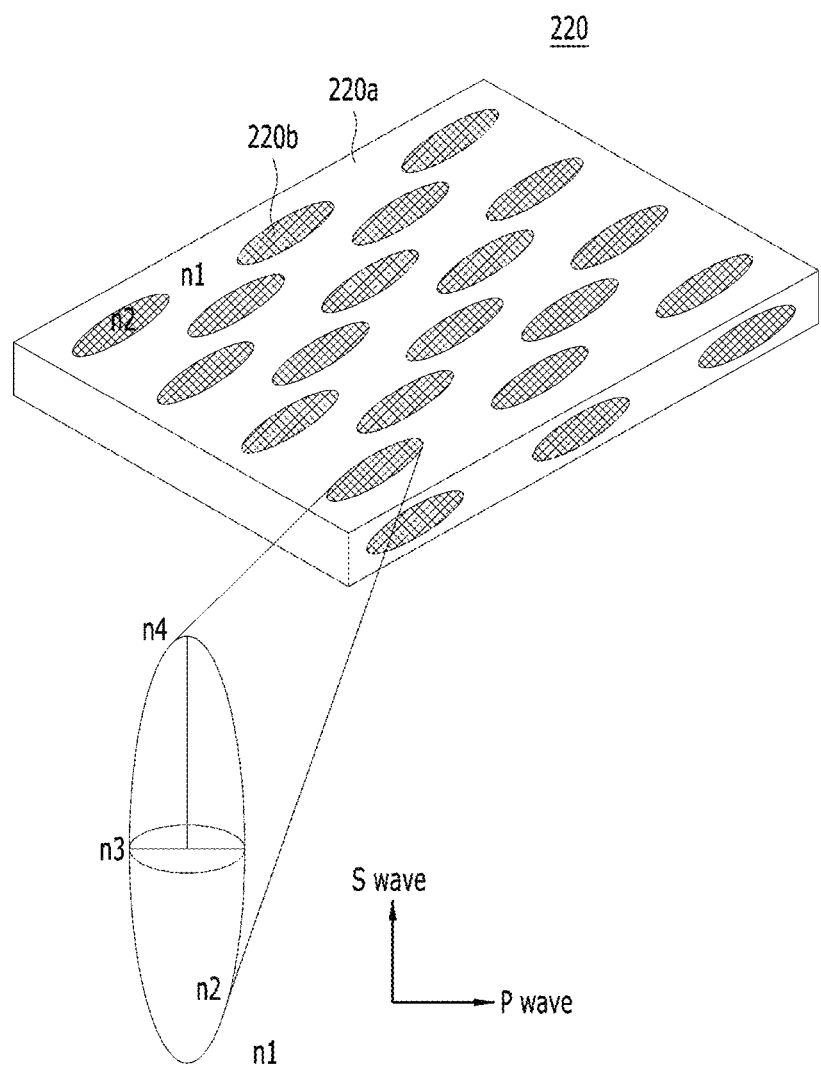
FIG. 9 is a perspective view exemplarily illustrating the configuration of an optical element in the display device according to the second embodiment of the present invention shown in FIG. 7.

In addition, FIG. 9 is a perspective view exemplarily illustrating the configuration of an optical element regarding the display device according to the second embodiment of the present invention shown in FIG. 7.

Referring to FIGS. 7 to 8, the display device according to the second embodiment of the present invention includes a display panel 210 where pixels are arranged in the form of a matrix to display an image, and a backlight unit 240 disposed on the rear surface of the display panel 210 to emit light toward the front surface of the display panel 210.

In the case where a liquid crystal display is suggested as an example of the display device, the display panel 210 may be a liquid crystal panel. Thus, the display panel 210 includes a color filter substrate 205 and an array substrate 215 which are bonded to each other while facing each other to maintain a uniform cell gap and a liquid crystal layer 230 formed in the cell gap between the color filter substrate 205 and the array substrate 215.

In addition, upper and lower polarizing plates 201 and 211 may be attached to the outer side of the display panel 210 having this configuration. In this case, the lower polarizing plate 211 polarizes light passing through the backlight unit 240 and the upper polarizing plate 201 polarizes light passing through the display panel 210.

Among them, the lower polarizing plate 211 attached to the bottom surface of the display panel 210 may include a polarizer 211a, and protective layers 211b' and 111b" formed at upper and lower sides of the polarizer 211a.

The lower polarizing plate 211 is a general polarizing element which transmits only some light having a vibration surface of a predetermined direction, among natural light having a vibration surface of all directions of 360 degrees, and absorbs the other light, thereby obtaining polarized light. For example, FIG. 8 shows, as an example, a case in which the lower polarizing plate 211 has a light transmission axis in a horizontal (left-and-right) direction. In this case, the upper polarizing plate 201 may have a light transmission axis in a vertical (up-and-down) direction.

The lower polarizing plate 211 can be attached to the lower surface of the array substrate 215 through an adhesive agent.

As mentioned above, the present invention is not limited to a direct method or edge method. However, for example, more specifically, in the case of the backlight unit 240 of the edge method, a plurality of lamps may be installed at one side of the light guide plate 242, and a reflection plate 241 may be installed at the rear surface of the light guide plate 242.

Light emitted from the lamp is incident upon the side surface of the light guide plate 242 made of a transparent material, and the reflection plate 241 disposed on the rear surface of the light guide plate 1242 reflects light transmitted to the rear surface of the light guide plate 242 toward optical sheets 243 on the upper surface of the light guide plate 242, thereby reducing light loss and improving uniformity.

In this case, the optical sheet 243 according to the second embodiment of the present invention includes a diffusion sheet and a prism sheet, and may further include a protective sheet.

As mentioned above, the display panel 210 including the color filter substrate 205 and the array substrate 215 is loaded on the backlight unit 240 having this configuration, to constitute the display device.

In this case, the present invention is characterized in that an optical element 220 to control viewing angle properties is provided between the display panel 210 and the backlight unit 240.

In this case, as mentioned above, the optical element 220 according to the second embodiment of the present invention may further include the anisotropic polymer 220b into which carbon black, a black dye or the like is incorporated.

In particular, the optical element 220 according to the second embodiment of the present invention is laminated to the lower polarizing plate 211 through an adhesive agent 209, but the present invention is not limited thereto, and the optical element 220 may be provided in the form of a sheet in the backlight unit 240, to constitute the backlight unit 240.

The optical element 220 according to the second embodiment of the present invention includes a resin 220a having a refractive index n1 and an anisotropic polymer 220b having a refractive index n2 different from n1, which is arranged in a predetermined direction in the resin 220a. In this case, n2 represents a mean refractive index of the anisotropic polymer 220b, which is shown by (n3+n4)/2, assuming that a refractive index in a short axis direction is n3 and a refractive index in a long axis direction is n4.

In this case, as mentioned above, the resin 220a may be made of a polymer having no anisotropy. As a medium layer, the resin 220a preferably has a refractive index n1 of 1.3 to 1.6 and has, for example, a refractive index n1 which is the same as that of the adhesive agent 209 having a refractive index of 1.5±0.05.

The resin 220a may be formed using a base material for an optical film, such as triacetate cellulose (TAC), acryl, polyethylene terephthalate (PET), polycarbonate (PC), or a cycloolefin polymer (COP).

In addition, the anisotropic polymer 220b may have any shape such as a rod or cylindrical shape so long as it can have an orientation (for example, n3<n4) in one direction.

In this case, the display device according to the second embodiment of the present invention can recycle light by controlling the anisotropy of the anisotropic polymer, thereby eliminating the necessity of further providing a brightness enhancement film such as a DBEF on the optical sheet 243, unlike the aforementioned first embodiment of the present invention.

That is, the optical element 220 according to the second embodiment of the present invention is characterized in that n1 is set to be equal to n3 and n4 is set to be larger than n3 in order to block upper and lower viewing angles, that is, to reduce diffusion of light the upper and lower directions. Here, as shown in FIG. 7, the upper and lower directions are based on the center where an image is displayed, when the display device is provided vertically.

That is, in order to block upper and lower viewing angles, the mean refractive index n2 of the anisotropic polymer 220b should be larger than the refractive index n1 of the resin 220a, and as the gap therebetween increases, the effect of blocking the viewing angle increases. In addition, for recycling of light, n1 should be substantially equal to n3. Here, "substantially equal" means "equal" when taking an error range into consideration.

For example, n1 and n3 should be 1.3 to 1.6, preferably, 1.5±0.05.

In addition, n4 should be larger than n3, and as the gap therebetween increases, the effect of recycling light increases. For example, n4 should be at least 1.3, preferably 1.35 to 1.65.

When the rod-shaped anisotropic polymer 220b having the refractive index n2 is arranged in a vertical direction in the resin 220a having the refractive index n1 (when the display device is provided vertically, as shown in FIG. 7), like the first embodiment of the present invention, light emitted from the backlight unit 240 diffuses due to the difference in refractive index between the anisotropic polymer 220b and the resin 220a. In this case, due to the rod shape of the anisotropic polymer 220b, based on the arrangement direction, horizontal (left-and-right) diffusion of light is increased and vertical (up-and-down) diffusion thereof is decreased.

Regarding the optical element 220 according to the second embodiment of the present invention, the anisotropic polymer 220b may be disposed in a substantially orthogonal direction to the light transmission axis of the lower polarizing plate 211. That is, the long direction of the anisotropic polymer 220b may be set to a direction substantially orthogonal to the light transmission axis of the lower polarizing plate 211.

In addition, when the refractive index in a short axis n3 of the anisotropic polymer 220b is substantially equal to the refractive index n1 of the resin 220a, and the refractive index in a long axis n4 is larger than the refractive index in a short axis n3, it is possible to recycle S-waves reflected by the anisotropic polymer 220b and contribute to increase in front brightness.

That is, the light source can be represented by a sum of vectors. As shown in FIG. 9, the light source can be divided into P wave and S wave. In this case, when a refractive index n1 of a medium is equal to the refractive index in a short axis n3 of the anisotropic polymer 220b, light of P wave direction can be transmitted. In addition, when the refractive index n1 of the medium is different from the refractive index in a long axis n4 of the anisotropic polymer 220b, light of S wave direction can be reflected. The reflected light of S wave direction changes its polarization into P wave by the reflection plate 241, is incident again upon the anisotropic polymer 220b and contributes to improvement in brightness through the anisotropic polymer 220b. Accordingly, the second embodiment of the present invention does not require the aforementioned brightness enhancement film, as mentioned above.

Figure 10A:
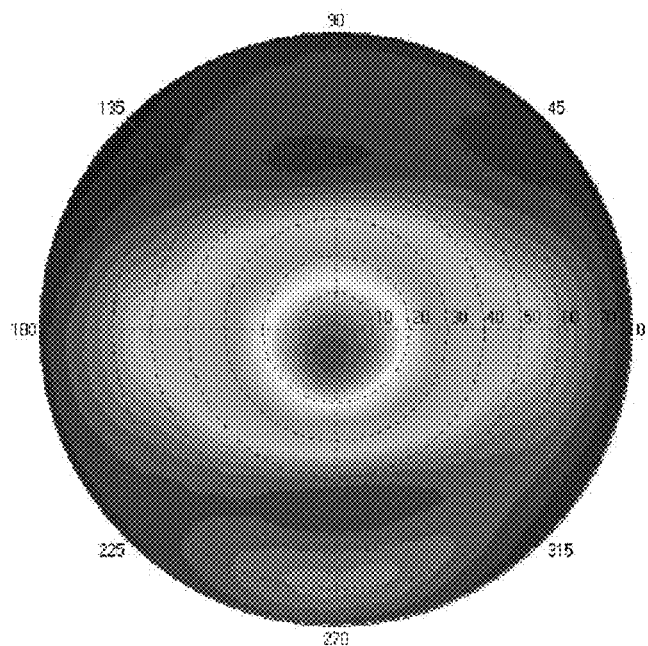
FIGS. 10A and 10B are views showing examples of brightness properties according to viewing angle.
Figure 10B:
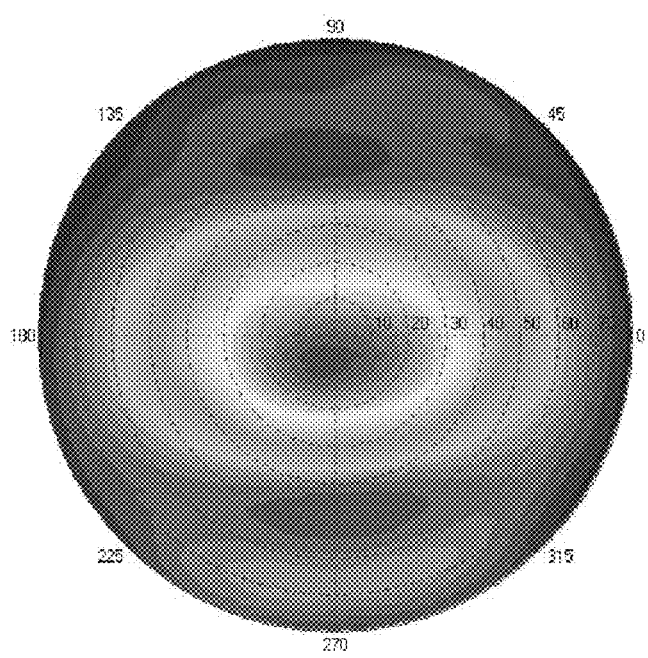

FIGS. 10a and 10B show examples of brightness properties according to viewing angle.

In this case, FIG. 10A shows brightness properties according to viewing angle regarding the display device according to the first embodiment of the present invention, and FIG. 10B shows brightness properties according to viewing angle regarding the display device according to the second embodiment of the present invention.

Figures 11, 12A:
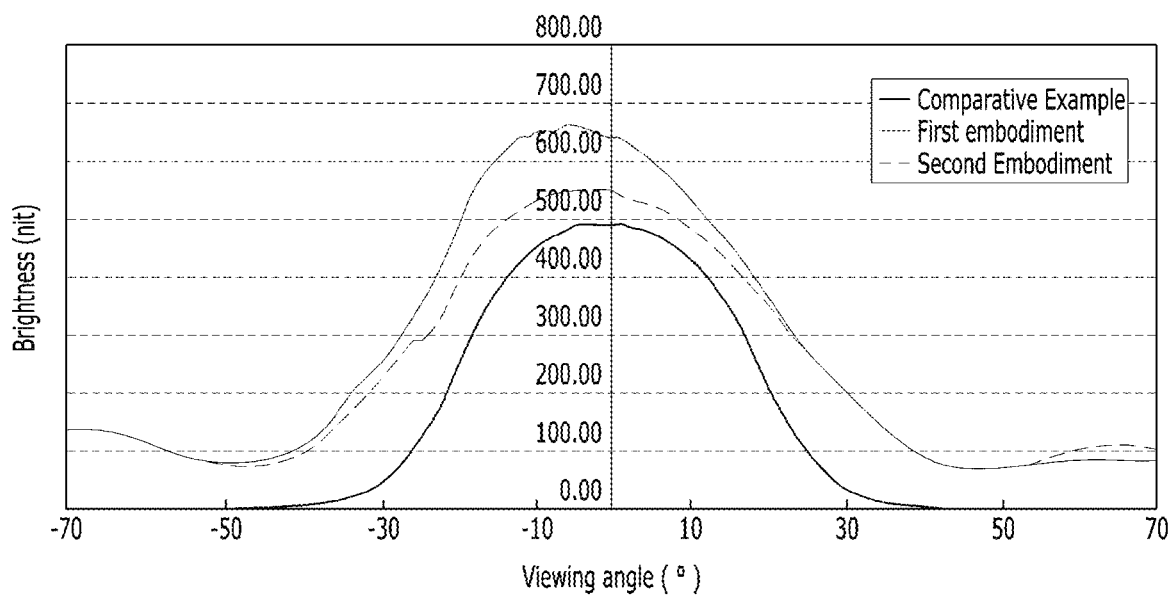
FIG. 11 is a graph showing an example of brightness properties according to viewing angle.
FIG. 12A is a table exemplarily showing optical properties depending on content of an anisotropic polymer in the display device according to the first embodiment of the present invention.

In addition, FIG. 11 is a graph showing an example of brightness properties according to viewing angle. In this case, Comparative Example suggests a case of a related art display device including a viewing angle control sheet using a louver, and Comparative Example and the first embodiment of the present invention suggest a case of further including a brightness enhancement film.

Referring to FIG. 10A, and FIGS. 10B and 11, the first and second embodiments of the present invention can control viewing angles of a vertical direction to a similar level to Comparative Example.

In addition, the first embodiment of the present invention exhibits an about 30% increase in front brightness, as compared to Comparative Example, and the second embodiment of the present invention exhibits an about 10% increase in front brightness, as compared to Comparative Example.

The first and second embodiments of the present invention exhibit a slight increase in upper viewing angle at which brightness is 15% of the front brightness, as compared to 30° of Comparative Example.

Such viewing angle control is possible without any louver pattern, and in particular, the second embodiment of the present invention does not require an additional brightness enhancement film, thus offering effects of decreasing manufacturing costs and preventing defects such as diagonal line spots.

FIG. 12A is a table exemplarily showing optical properties depending on content of the anisotropic polymer in the display device according to the first embodiment of the present invention. In addition, FIG. 12B is a table exemplarily showing brightness and viewing angle properties depending on content of the anisotropic polymer in the display device according to the first embodiment of the present invention.

Figures 12B, 13A:
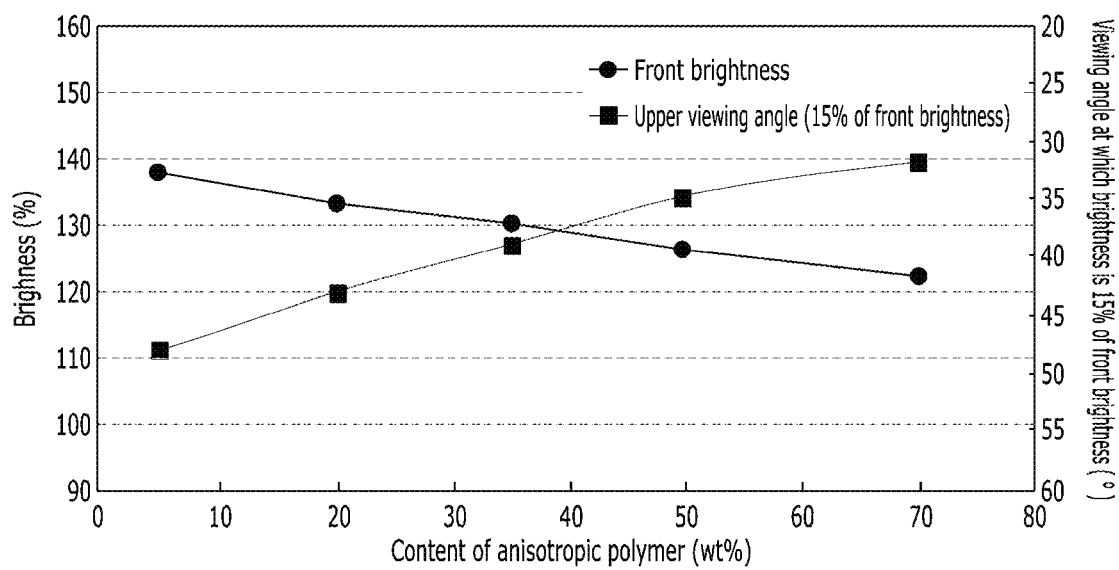
FIG. 12B is a table exemplarily showing brightness and viewing angle properties depending on content of the anisotropic polymer in the display device according to the first embodiment of the present invention.
FIG. 13A is a table exemplarily showing optical properties depending on content of the anisotropic polymer in the display device of the second embodiment of the present invention.

In this case, FIGS. 12A and 12B exemplarily show optical properties such as light leakage and haze in cases where the anisotropic polymer is present in amounts of 5 wt %, 20 wt %, 35 wt %, 50 wt % and 70 wt % with regard to the optical element.

In addition, FIGS. 12A and 12B show a case in which the refractive index n1 of the resin is about 1.55 and the refractive index n2 of the anisotropic polymer is about 1.64.

It can be seen from FIGS. 12A and 12B that, as the content of the anisotropic polymer increases, the effect of blocking an upper viewing angle increases.

That is, it can be seen that, when the anisotropic polymer is present in amounts of 5 wt %, 20 wt %, 35 wt %, 50 wt % and 70 wt % with respect to the optical element, upper viewing angles at which brightness corresponds to 15% of the front brightness are 48°, 43°, 39°, 35° and 32°, respectively.

As the content of the anisotropic polymer increases, total thickness increases, there is a drawback of light leakage, haze increases and front brightness decreases.

That is, it can be seen that, when the anisotropic polymer is present in amounts of 5 wt %, 20 wt %, 35 wt %, 50 wt % and 70 wt % with respect to the optical element, light leakages are level 1 (Lv), level 1, level 2, level 2 and level 4, respectively. In this case, when light leakage is level 2 or less, an article is determined to be applicable to mass-production.

In addition, it can be seen that, when the anisotropic polymer is present in amounts of 5 wt %, 20 wt %, 35 wt %, 50 wt % and 70 wt % with respect to the optical element, front brightnesses are 138%, 133%, 130%, 126% and 122%, respectively.

Accordingly, the anisotropic polymer can be added in an amount of about 5 to 50 wt %, preferably 35 to 50 wt %, with respect to the optical element.

FIG. 13A is a table exemplarily showing optical properties depending on content of the anisotropic polymer in the display device of the second embodiment of the present invention. In addition, FIG. 13B is a graph exemplarily showing brightness and viewing angle properties depending on content of the anisotropic polymer in the display device according to the second embodiment of the present invention.

Figure 13B:
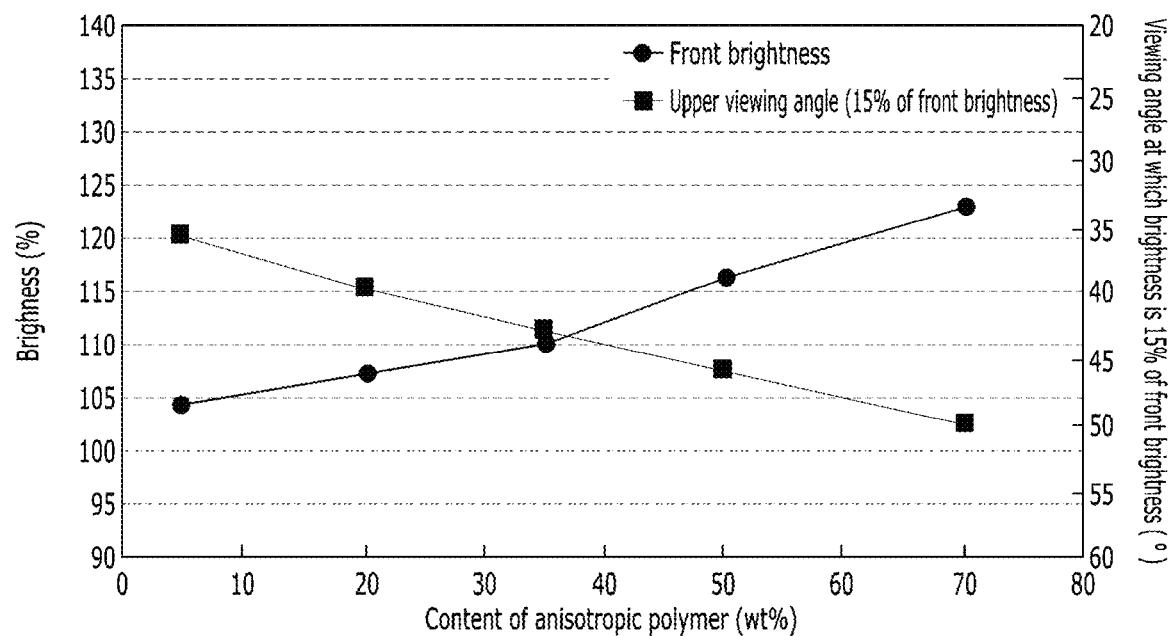
FIG. 13B is a graph exemplarily showing brightness and viewing angle properties depending on content of the anisotropic polymer in the display device according to the second embodiment of the present invention.

In this case, FIGS. 13A and 13B exemplarily show optical properties such as light leakage, haze and recycling efficiency in cases in which the anisotropic polymer is present in amounts of 5 wt %, 20 wt %, 35 wt %, 50 wt % and 70 wt % with regard to the optical element.

Referring to FIGS. 13A and 13B, as the content of the anisotropic polymer increases, front brightness increases due to increased recycling efficiency, but the effect of blocking the upper viewing angle is insufficient.

That is, it can be seen that, in the cases in which the anisotropic polymer is present in amounts of 5 wt %, 20 wt %, 35 wt %, 50 wt % and 70 wt % with regard to the optical element, the recycling efficiencies are 105%, 110%, 118%, 124% and 131%, respectively. In addition, when the anisotropic polymer is present in amounts of 5 wt %, 20 wt %, 35 wt %, 50 wt % and 70 wt % with regard to the optical element, front brightnesses are 104%, 107%, 110%, 116% and 123%, respectively, and upper viewing angles corresponding to 15% of the front brightness are 36°, 40°, 43°, 46° and 50°, respectively.

In addition, as the content of the anisotropic polymer increases, the total thickness increases, there is a drawback of light leakage, and haze increases.

That is, it can be seen that, when the anisotropic polymer is present in amounts of 5 wt %, 20 wt %, 35 wt %, 50 wt % and 70 wt % with respect to the optical element, light leakages are level 1 (Lv), level 1, level 2, level 2 and level 4, respectively. In this case, when light leakage is level 2 or less, an article is determined to be applicable to mass-production.

Accordingly, the anisotropic polymer can be added in an amount of about 5 to 50 wt %, preferably 5 to 20 wt %, with respect to the optical element.

As mentioned above, the optical element according to the present invention may be provided in the form of a sheet in the backlight unit, which will be described with reference to a third embodiment of the present invention.

Figure 14:
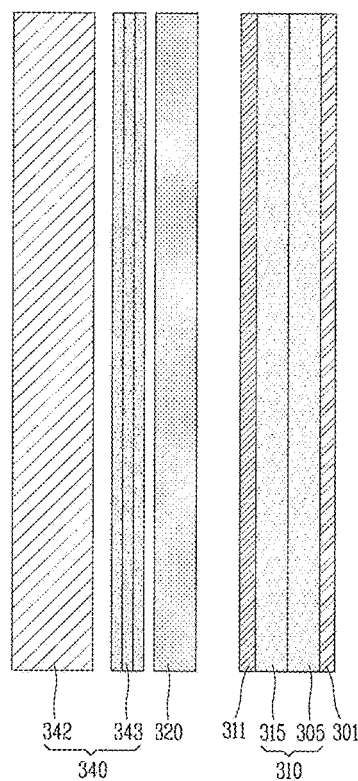
FIG. 14 is a sectional view schematically illustrating the configuration of a display device according to a third embodiment of the present invention.

FIG. 14 is a sectional view schematically illustrating the configuration of a display device according to a third embodiment of the present invention.

In this case, the display device according to the third embodiment of the present invention shown in FIG. 14 has substantially the same configuration as the display devices of the first and second embodiments of the present invention, except that the optical element is provided in the form of a sheet in the backlight unit.

In addition, an example in which the display device shown in FIG. 14 is a liquid crystal display is suggested, but, as mentioned above, the present invention is not limited thereto.

Referring to FIG. 4, the display device according to the third embodiment of the present invention includes a display panel 310 where pixels are arranged in the form of a matrix to display an image, and a backlight unit 340 disposed on the rear surface of the display panel 310 to emit light toward the front surface of the display panel 310.

In the case where a liquid crystal display is suggested as an example of the display device, the display panel 310 may be a liquid crystal panel. Thus, the display panel 310 includes a color filter substrate 105 and an array substrate 315 which are bonded to each other while facing each other, to maintain a uniform cell gap and a liquid crystal layer formed in the cell gap between the color filter substrate 305 and the array substrate 315.

In addition, upper and lower polarizing plates 301 and 311 may be attached to the outer side of the display panel 310 having this configuration. In this case, the lower polarizing plate 311 polarizes light passing through the backlight unit 340 and the upper polarizing plate 301 polarizes light passing through the display panel 310.

As mentioned above, the present invention is not limited to a direct method or edge method. However, for example, more specifically, in the case of the backlight unit 340 of the edge method, a plurality of lamps may be installed at one side of the light guide plate 342, and a reflection plate may be installed at the rear surface of the light guide plate 342.

Light emitted from the lamp is incident upon the side surface of the light guide plate 342 made of a transparent material, and the reflection plate disposed on the rear surface of the light guide plate 342 reflects light transmitted to the rear surface of the light guide plate 342 toward optical sheets 343 on the upper surface of the light guide plate 342, thereby reducing light loss and improving uniformity.

In this case, the optical sheet 343 according to the third embodiment of the present invention includes a diffusion sheet and a prism sheet, and may further include a protective sheet.

In this case, the display device according to the third embodiment of the present invention is characterized in that an optical element 320 to control properties of viewing angle is provided on the optical sheet 343. That is, the optical element 320 according to the third embodiment of the present invention may be provided in the form of a sheet in the backlight unit 340 to constitute the backlight unit 340.

The display panel 310 including the color filter substrate 305 and the array substrate 315 is loaded on the backlight unit 340 having this configuration, to constitute the display device, as mentioned above.

The optical element 320 according to the third embodiment of the present invention includes a resin having a refractive index n1 and an anisotropic polymer having a refractive index n2 different from n1, which is arranged in a predetermined direction in the resin. In this case, n2 represents a mean refractive index of the anisotropic polymer, which is shown by (n3+n4)/2, assuming that a refractive index in a short axis is n3 and a refractive index in a long axis is n4.

In this case, as mentioned above, the resin may be made of a polymer having no anisotropy. As a medium layer, the resin preferably has a refractive index n1 of 1.3 to 1.6.

The resin may be formed using a base material for an optical film, such as triacetate cellulose (TAC), acryl, polyethylene terephthalate (PET), polycarbonate (PC), or a cycloolefin polymer (COP).

In addition, the anisotropic polymer may have any shape such as a rod or cylindrical shape so long as it can have an orientation (for example, n3<n4) in one direction.

In this case, substantially similar to the optical element according to the first embodiment of the present invention, the optical element 320 according to the third embodiment of the present invention is characterized in that n2 is set to be larger than n1 in order to block upper and lower viewing angles, that is, reduce diffusion of light in a vertical (up and down) direction. Here, as shown in FIG. 14, the up and down directions are based on the center where an image is displayed, when the display device is provided vertically, as shown in FIG. 14.

That is, in order to block upper and lower viewing angles, the mean refractive index n2 of the anisotropic polymer should be larger than the refractive index n1 of the resin, and as the gap therebetween increases, the effect of blocking the viewing angle increases. For example, n2 should be at least 1.3, preferably, 1.4 to 1.8, more preferably, 1.5 to 1.68.

In this case, n1 should be different from n3, and n1 should be different from n4.

In addition, regarding the optical element 320 according to the third embodiment of the present invention, the anisotropic polymer may be disposed in a direction substantial orthogonal to the light transmission axis of the lower polarizing plate 311. That is, the long direction of the anisotropic polymer may be set to a direction substantial orthogonal to the light transmission axis of the lower polarizing plate 311.

Alternatively, substantially similar to the second embodiment of the present invention, the display device according to the third embodiment of the present invention can recycle light by controlling the anisotropy of the anisotropic polymer, thereby eliminating the necessity of further providing a brightness enhancement film such as a DBEF on the optical sheet 343.

That is, in this case, the optical element 320 according to the third embodiment of the present invention is characterized in that n1 is set to be equal to n3 and n4 is set to be larger than n3 in order to block upper and lower viewing angles, that is, to reduce diffusion of light in upper and lower directions.

That is, in order to block upper and lower viewing angles, the mean refractive index n2 of the anisotropic polymer should be larger than the refractive index n1 of the resin, and as the gap therebetween increases, the effect of blocking the viewing angle increases. In addition, for recycling of light, n1 should be substantially equal to n3. Here, "substantially equal" means "equal" when taking an error range into consideration.

For example, n1 and n3 should be 1.3 to 1.6, preferably, 1.5±0.05.

In addition, n4 should be larger than n3, and as the gap therebetween increases, the effect of recycling light increases. For example, n4 should be at least 1.3, preferably 1.35 to 1.65.

Regarding the optical element 320 according to the third embodiment of the present invention, when the refractive index in a short axis n3 of the anisotropic polymer is substantially equal to the refractive index n1 of the resin, and the refractive index in a long axis n4 is larger than the refractive index in a short axis n3, it is possible to recycle S waves reflected by the anisotropic polymer and thereby contribute to increase in front brightness.

The optical elements according to the first, second and third embodiments of the present invention may be, for example, formed by mixing a predetermined amount of resin as a base material with an anisotropic polymer, forming a film by extrusion and subjecting the anisotropic polymer to orientation in a predetermined direction by stretching.

As mentioned above, the display device is not limited to the liquid crystal display and may be an organic light emitting display device. This will be described in detail with reference to a fourth embodiment of the present invention.

Figure 15:
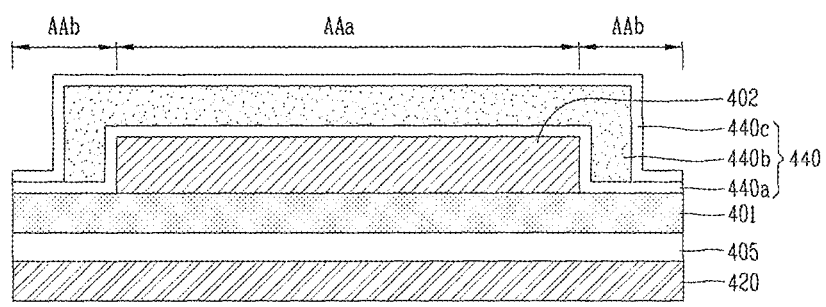
FIG. 15 is a sectional view schematically illustrating the configuration of a display device according to a fourth embodiment of the present invention.

FIG. 15 is a sectional view schematically illustrating the configuration of the display device according to the fourth embodiment of the present invention, which exemplarily illustrates a cross-sectional structure of a panel assembly in an active area.

The organic light emitting display device according to the fourth embodiment of the present invention broadly includes a panel assembly to display an image and a flexible circuit board connected to the panel assembly.

The panel assembly may include a panel part which is divided into an active area and a pad area, and a thin film sealing layer which covers the active area and is provided on the panel part.

Referring to FIG. 15, the panel part may be disposed on the substrate 401.

The substrate 401 may be a flexible substrate.

The flexible substrate may be a plastic material with excellent heat resistance and durability, such as polyethylene terephthalate (PET), polyethylene naphthalate (PEN), polycarbonate (PC), polyarylate, polyetherimide (PEI), polyethersulfone (PES) and polyimide. However, the present invention is not limited thereto and a variety of flexible materials may be used.

Like in the fourth embodiment of the present invention, in the case of a bottom emission-type in which an image is displayed in a direction of the substrate 401, the substrate 401 should be formed using a transparent material. However, the present invention is not limited thereto and is applicable to a front emission type in which the image is displayed in a direction opposite to the substrate 401. In this case, the substrate 401 does not need to be formed using a transparent material.

In addition, the active area may be divided into a pixel area AAa where a plurality of sub-pixels are disposed to display an image and a peripheral area AAb disposed outside the pixel area AAa to transfer an exterior signal into the pixel area AAa.

In this case, the thin film sealing layer 440 may be formed on the panel part such that the thin film sealing layer 440 covers a part of the pixel area AAa and the peripheral area AAb.

In this case, the sub-pixels are disposed in the form of a matrix in the active area, and a scan driver to drive pixels, a driving element such as a data driver and other components are disposed outside the active area.

In addition, a panel element 402 may be disposed on the upper surface of the substrate 401 of the pixel area AAa. As used herein, the term "panel element" 402 broadly refers to an organic light emitting diode and a TFT array to drive the organic light emitting diode, for convenience of description.

Each sub-pixel includes an organic light emitting diode and an electronic element electrically connected to the organic light emitting diode. The electronic element may include at least two TFTs, storage capacitors and the like. The electronic element is electrically connected to lines and is driven through an electrical signal received from the driving element disposed outside the panel part. An array of the electronic element and lines electrically connected to the organic light emitting diode is referred to as a "TFT array".

The organic light emitting diode includes a first electrode, an organic compound layer and a second electrode.

In this case, in addition to a light emitting layer where emission of light is carried out, the organic compound layer may further include a variety of organic layers which efficiently transfer a carrier of holes or electrons to the light emitting layer.

The organic layers may include a hole injection layer and a hole transfer layer disposed between a first electrode and the light emitting layer, and an electron injection layer and an electron transfer layer disposed between the second electrode and the light emitting layer.

As such, the first electrode made of transparent oxide is formed on the TFT array, and the organic compound layer and the second electrode are sequentially stacked on the first electrode.

Based on this structure, the organic light emitting diode has a configuration in which holes injected from the first electrode and electrons injected from the second electrode respectively pass through the transfer layer for transfer and are combined with each other in the light emitting layer and are then shifted to a lower energy level, thus producing light of wavelength corresponding to the energy difference in the light emitting layer.

In addition, the TFT basically includes a switching transistor and a driving transistor.

The switching transistor is connected to a scan line and a data line and transmits data voltage input to the data line to the driving transistor, depending on the switching voltage input to the scan line. The storage capacitor is connected to the switching transistor and the power supply line, and stores a voltage corresponding to the difference between the voltage received from the switching transistor and the voltage supplied to the power supply line.

The driving transistor is connected to the power supply line and the storage capacitor, and supplies, to the organic light emitting diode, an output current which is proportional to the square of the difference between the voltage stored in the storage capacitor and the threshold voltage, and the organic light emitting diode emits light by the output current.

The driving transistor includes an active layer, a gate electrode and source/drain electrodes, and the first electrode of the organic light emitting diode is connected to the drain electrode of the driving transistor.

For example, the driving transistor may include an active layer formed on the buffer layer and a first insulation layer formed on the substrate 401 provided with the active layer. In addition, the driving transistor may include a gate electrode formed on the first insulation layer, a second insulation layer formed on the substrate 401 provided with the gate electrode and source/drain electrodes formed on the second insulation layer and electrically connected to source/drain areas of the active layer through a first contact hole.

A third insulation layer may be formed on the substrate 401 provided with the driving transistor.

In addition, a color filter may be formed on the third insulation layer. The color filter of each sub-pixel may have any one color of red, green and blue. In addition, the sub-pixel rendering white may have no color filter. The array of red, green and blue may be variable and a black matrix capable of absorbing exterior light may be provided between respective color filters.

In the case of the bottom emission type, the color filter may be disposed under the first electrode.

A fourth insulation layer may be formed on the substrate 401 provided with the color filter.

In this case, the drain electrode of the driving transistor may be electrically connected to the first electrode through a second contact hole formed in the third insulation layer and the fourth insulation layer.

In addition, a bank may be formed at the boundary between respective sub-pixel areas on the fourth insulation layer. That is, the bank may have a lattice structure taking the shape of a matrix, and surround an edge of the first electrode and expose a part of the first electrode.

The organic compound layer of the aforementioned organic light emitting diode may be formed over the entire surface of the substrate 401. In this case, a patterning process can be omitted and there is thus an effect of simplifying the overall process. However, the present invention is not limited thereto and an organic compound layer may be also formed on the first electrode between the banks.

A second electrode is formed on the organic compound layer of the display area.

A capping layer made of an organic material such as a polymer may be formed over the entire surface of the substrate 401 of the pixel part on the substrate 401 provided with the second electrode. However, the present invention is not limited thereto and the capping layer may be omitted.

Referring to FIG. 15 again, a thin film sealing layer 440 may be formed on the upper surface of the substrate 401 provided with the second electrode such that the thin film sealing layer 440 covers the panel element 402. The organic light emitting diode included in the panel element 402 includes an organic material and is thus readily deteriorated by exterior moisture or oxygen. Accordingly, in order to protect this organic light emitting diode, the panel element 402 should be sealed. The thin film sealing layer 440 serves to seal the panel element 102, which has a structure in which a plurality of inorganic films and a plurality of organic films are alternately stacked. The panel element 402 is sealed with the thin film sealing layer 440, not a sealing substrate, thereby imparting thinness and flexibility to the organic light emitting display device. However, the present invention is not limited thereto.

The thin film sealing layer 440 will be described in detail. For example, a first protective film 440a, an organic film 440b and a second protective film 440c are sequentially formed as sealing means on the substrate 401 provided with the panel element 402, to constitute the thin film sealing layer 440. As mentioned above, the numbers of the inorganic films and the organic films constituting the thin film sealing layer 440 are not limited.

An integrated circuit chip may be mounted in a chip on glass (COG) manner in the pad area of the panel assembly configured as mentioned above.

Electronic elements to conduct processing of a driving signal are mounted in a chip on film (COF) manner in the flexible circuit board and a connector to transmit an exterior signal to the flexible circuit board may be installed.

The flexible circuit board may be folded toward the back of the panel assembly such that the flexible circuit board faces the rear surface of the panel assembly. In this case, an anisotropic conductive film may be used to electrically connect a terminal portion of the panel part to a connection portion of the flexible circuit board.

Regarding the organic light emitting display deice having this configuration according to the fourth embodiment of the present invention, in the case of the bottom emission type, the rear surface of the substrate 401 is provided with an optical element 420 to control viewing angle properties (that is, brightness properties according to viewing angle, in other words, emission direction of light).

In particular, the optical element 420 according to the fourth embodiment of the present invention is laminated to the substrate 401 through an adhesive agent 409. However, the present invention is not limited thereto and the optical element 420 may be attached in the form of a sheet to the substrate 401.

Substantially similar to the first to third embodiments of the present invention, the optical element 420 according to the fourth embodiment of the present invention is characterized in that, in a resin having a refractive index n1, an anisotropic polymer having a refractive index n2 different from n1 is disposed in a predetermined direction.

In this case, in order for the optical element 420 according to the fourth embodiment of the present invention to block upper and lower viewing angles, that is, to reduce diffusion of light in a vertical direction, n2 may be set to be larger than n1.

In this case, n1 should be different from n3 and n1 should be different from n4. In this case, n2 represents a mean refractive index of the anisotropic polymer, which is shown by (n3+n4)/2, assumed that a refractive index in a short axis is n3 and a refractive index in a long axis is n4.

Alternatively, in order for the optical element 420 according to the fourth embodiment of the present invention to block upper and lower viewing angles, that is, to reduce diffusion of light in a vertical direction, as well as provide light recycling, n1 may be set to be equal to n3 and n4 may be set to be greater than n3. That is, for recycling of light, n1 should be substantially equal to n3. Here, "substantially equal" means "equal" when taking an error range into consideration.

As mentioned above, the present invention provides an optical element to control upper and lower viewing angles. For example, the present invention can minimize a phenomenon in which a display panel is visible to a vehicle front glass, by applying the optical element to a backlight unit for vehicles or a display device, thereby providing viewing angle properties to enable optimum operation conditions.

In addition, such control of viewing angles is possible without using any louver pattern and eliminates the necessity of an additional brightness enhancement film, thus advantageously decreasing manufacturing costs and preventing defects such as diagonal line spots.

It will be apparent to those skilled in the art that various modifications and variations can be made in the optical element and the display device including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. An optical element, comprising:
a resin having a refractive index n1; and
a plurality of anisotropic polymers in the resin and having a refractive index n2 larger than n1,
wherein the anisotropic polymers are arranged in the same direction;
wherein the anisotropic polymers are added in an amount of 5 to 20 wt % with respect to the optical element; and
wherein a mean refractive index of each anisotropic polymer is larger than the refractive index n1 of the resin, and as the mean refractive index of each anisotropic polymer increases relative to the refractive index n1 of the resin, an effect of blocking a viewing angle increases.

2. The optical element according to claim 1, wherein the resin comprises triacetate cellulose (TAC), acryl, polyethylene terephthalate (PET), polycarbonate (PC), or a cycloolefin polymer (COP).

3. The optical element according to claim 1, wherein each of the anisotropic polymers is a rod or cylindrical shape.

4. The optical element according to claim 1, wherein n1 is equal to the refractive index in the short axis n3 of each anisotropic polymer, and wherein the refractive index in the long axis n4 of each anisotropic polymer is larger than n3.

5. The optical element according to claim 4, wherein n1 and n3 are 1.5±0.05.

6. The optical element according to claim 5, wherein n4 is 1.35 to 1.65.

7. The optical element according to claim 1, wherein each of the anisotropic polymers further comprises carbon black or a black dye.

8. A display device comprising a display panel comprising the optical element according to claim 1 and a polarization plate provided at a side of the optical element.

9. The display device according to claim 8, wherein the optical element comprises an anisotropic polymer disposed in a direction orthogonal to a light transmission axis of the polarizing plate.

10. An optical element, comprising:
a resin having a refractive index n1; and
a plurality of anisotropic polymers in the resin and having a refractive index n2 larger than n1,
wherein the anisotropic polymers are arranged in the same direction;
wherein the anisotropic polymers are added in an amount of 35 to 50 wt % with respect to the optical element; and
wherein a mean refractive index of each anisotropic polymer is larger than the refractive index n1 of the resin, and as the mean refractive index of each anisotropic polymer increases relative to the refractive index n1 of the resin, an effect of blocking a viewing angle increases.

11. The optical element according to claim 10, wherein each of the anisotropic polymers further comprises carbon black or a black dye.

12. The optical element according to claim 10, wherein n1 is different from a refractive index in a short axis n3 of each anisotropic polymer, and wherein n1 is different from a refractive index in a long axis n4 of each anisotropic polymer.

13. The optical element according to claim 12, wherein n2 is 1.5 to 1.68.

* * * * *